Patented Sept. 14, 1943

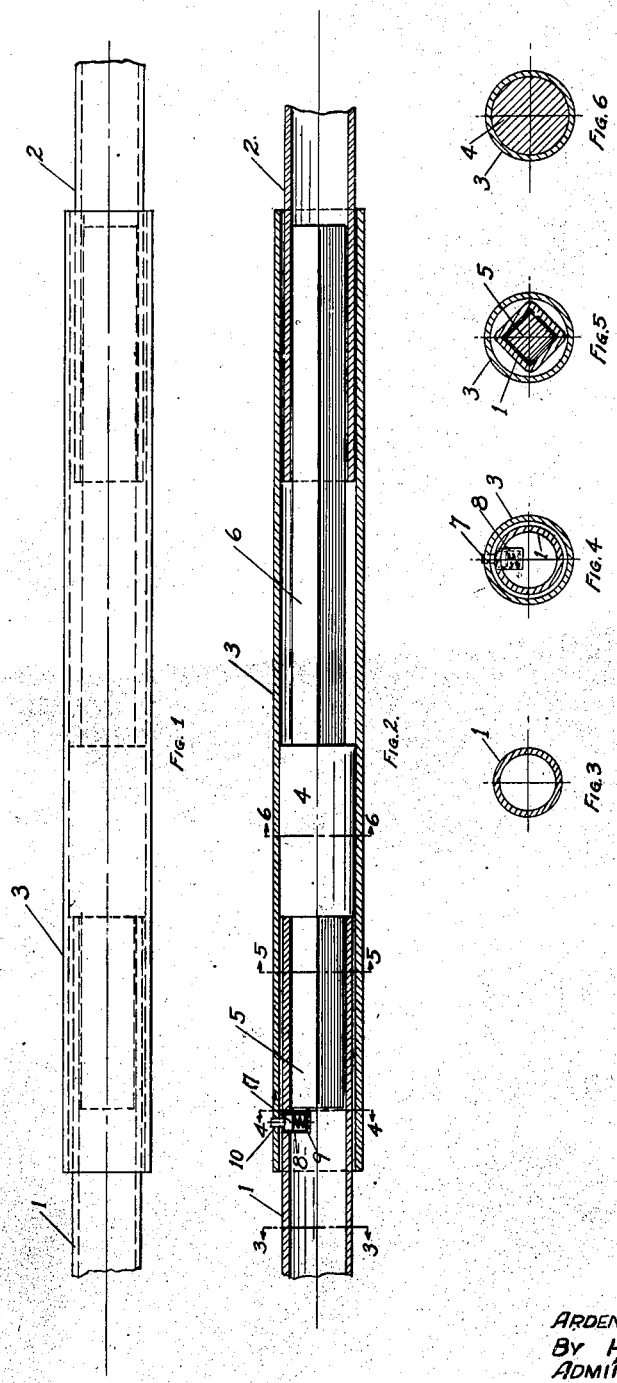

2,329,601

UNITED STATES PATENT OFFICE 2,329,601

POWER TRANSMISSION MEANS

Arden Frye, deceased, late of Scott County, Iowa, by Harry H. Frye, administrator, Scott County, Iowa Application April 20, 1942, Serial No. 439,794

5 Claims. (Cl. 64—23)

The present invention pertains to means for transmitting power from a power producing mechanism, for example, a tractor, to a power utilizing mechanism, such as a combine, a baler, a corn picker, or any other unit which must be pulled by a tractor vehicle and, simultaneously, while being pulled, utilizes power transmitted from the power generating unit. Various power take-offs, so-called, have been designed but, on the whole, they have been unsatisfactory for the reason that they were angular in shape or had parts projecting from the surface thereof which could catch clothing and result in injury to a person unfortunate enough to have his clothing caught by the power take-off shaft.

Power producing units, such as tractor units, are often provided with rotating shafts from which power can be transmitted to power utilizing mechanisms. For example, a tractor is provided with a hitch by means of which a load may be connected thereto to be drawn thereby and is also provided with a rearwardly directed shaft by means of which power generated by the tractor may be transmitted to the load unit for the purpose of rotating certain mechanism carried thereby. Such shaft is customarily provided with a universal joint to accommodate the bend which must take place when the tractor changes direction.

The main object, therefore, of this invention is to provide power transmitting means for use between a travelling power generating unit and a power utilizing unit drawn thereby which will be devoid of any projections which can take hold of the clothing of a person working around the machine and cause injury to him as a result thereof. Another important object of this invention is to provide a structure which is so designed that a person working alone may connect the tractor unit to the load without needing to call for assistance and without danger of being injured during the operation. Another important object of this invention is to provide a power transmitting unit such that the tractor unit may be connected to the load and then, after this has been done, the connection of the power take-off between the power generating unit and the power utilizing unit may be made simply and easily, and such further objects, advantages, and capabilities as will hereafter appear and as are inherent in the construction disclosed herein. This invention further resides in the combination, construction, and arrangement of parts illustrated in the accompanying drawing and, while what has been shown therein is regarded as the preferred embodiment of this invention, it is desired that the same be understood as illustrative only and not be interpreted in a limiting sense.

In the drawing annexed hereto and forming a part hereof,

Fig. 1 represents a fragmentary side elevation of a structure embodying the present invention;

Fig. 2 represents a longitudinal section of the structure shown in Fig. 1, partly in elevation;

Fig. 3 represents a section taken substantially along the plane indicated by the line 3—3, Fig. 2;

Fig. 4 represents a transverse section taken substantially along the plane indicated by the line 4—4, Fig. 2;

Fig. 5 represents a transverse section taken substantially along the plane indicated by the line 5—5, Fig. 2; and Fig. 6 represents a transverse section taken substantially along the plane indicated by the line 6—6, Fig. 2.

Reference will now be made in greater detail to the annexed drawing for a more complete description of this invention.

The present construction comprises a section 1 which may be partly or wholly tubular and which is adapted to be connected to the universal joint so that any motion of rotation of this joint will be transmitted to section 1 to be transmitted thereby to the power utilizing unit.

A second tubular member 2 is connected to the power utilizing means of the load unit. This, also, may be partially or wholly tubular for the same purpose as in the case of section 1. By preference, these two units are externally cylindrical, with the exception of their adjacent ends. As shown in Fig. 5, these ends are preferably non-circular in cross-section to fit about and drive an intermediate section. This intermediate section comprises the tubular cylindrical body 3 having a solid block or body 4, preferably cylindrical in form, rigidly secured therein. From the ends of this body 4 project reduced extensions 5 and 6, the same being non-circular in form and having the same external shape as the internal shape of the adjacent ends of the members 1 and 2. Thus, it will be seen that, when the ends of parts 1 and 2 are inserted into the member 3, they may encircle the reduced ends 5 and 6 of the block 4.

From the foregoing it will be seen that, when power is applied to the unit 1 to rotate the same, it will cause rotation of the central block or body 4 and its projecting ends 5 and 6. From the latter this power will be transmitted to the element 2, and from this to the power utilizing unit. The sleeve 3, being rigidly secured to the block 4, will rotate therewith. This sleeve has an opening therein for the reception of the outer end of a spring-pressed plunger 7 enclosed in a casing 8 and actuated outwardly by a spring 9. Since relative rotation of the parts 1 and 3 is practically nil, there is no driving force exerted by one upon the other. However, the unit 7, engaged in the opening in the tube 3, will prevent relative longitudinal motion of these two.

If it is desired to drive a rotary mechanism forming a part of the load, for example, the mechanism of a corn picker or other machine, the tractor is first hitched to the load and then the unit 3 is applied to the unit 2, with which the corn picker has been supplied. The two are shoved together until the forward end of the unit 2 abuts against or substantially against the block 4. The forward end of the unit 3 is then raised and brought into alignment with the unit 1 with which the tractor has been equipped. When the two have been brought into alignment, then the central unit, 3, 4, 5, 6 is moved forwardly until the rear end of the unit 1 abuts against or substantially against the block 4. When this is done, the plunger 7 enters into the opening 10 provided for this plunger and fastens the two together. This is done by moving the central unit forwardly without moving either tractor or load. When the plunger 7 snaps into the opening 10 there is no danger of disconnection at any point in this power take-off unit. Furthermore, there is no projection on the outer surface of this unit which could result in the operator's clothing getting caught and causing injury to him.

From the foregoing it will be seen how simple this construction is, how easily it can be fabricated, how easily the power take-off unit can be connected between the traction unit and the load, and how well adapted this device is to carry out all of the objects stated above.

It will of course be understood that the specific description of structure set forth above may be departed from without departing from the spirit of this invention as set forth in this specification and the appended claims.

Having now described this invention, what is claimed is:

1. A composite power take-off shaft comprising a central tubular section having a closure member secured in its central portion, said closure member having an extension projecting longitudinally from each of its ends, said extensions being non-circular in cross-section, a tubular connecting member extending into each end of said tubular section and each having its enclosed end shaped to fit fairly closely about a non-circular extension of said closure member.

2. A power take-off for connecting the power output shaft of a power developing unit and the power input shaft of a power utilizing unit, said take-off comprising, in combination, a tubular cylindrical member having a block securely mounted in its intermediate portion, said block having reduced end portions which are non-circular in cross-section, said power take-off having a space between each of said reduced ends and the surrounding tubular member for the reception of a tubular member inserted endwise into said cylindrical tubular member, the inserted tubular members being rendered, at least internally, non-circular in cross-section to substantially fit the said reduced ends of said block.

3. A structure as defined by claim 2 provided near one end with an opening through the wall of the tubular member for the reception of a latching means.

4. Power take-off means comprising a member for connection to a universal joint of a power generating unit, said member being tubular at its end remote from the joint, the opening in said end being angular in cross-section, the wall of said member having a spring-pressed latching member extending therethrough and projecting outwardly to engage in an opening in the wall of a tubular member cooperating therewith, a tubular member receiving in one of its ends the internally non-circular end portion of the first mentioned member, a block rigidly secured in the intermediate portion of said tubular member, the end portions of said block being reduced in size and angular in cross-section to approximately fit in the angular opening in the end of the first mentioned member, the second reduced end of said block being non-circular in cross-section and spaced from the surrounding wall of the second tubular member to receive, between the two, the end of a third tubular member, and a third tubular member having an internal cross-section to approximately fit the second angular end of said block so that power applied to the member connected to the universal joint will be transmitted through the block to the third tubular member.

5. A power transmission means comprising a plurality of telescoping units, one to be connected to the universal joint of the power output of a power developing machine, one to be connected to the power input shaft of a power utilizing machine, and a third unit surrounding the adjacent ends of the other two units, said adjacent ends of the first two units being hollow and non-circular in cross-section, said adjacent end of the first unit having a latching member mounted in an opening extending transversely through the wall thereof, said latching member projecting beyond the wall of said first unit and, when in use, through an opening in the wall of the third unit whereby to latch the two units against inadvertent longitudinal motion with reference to each other which would result in their being disconnected.

HARRY H. FRYE,
*Administrator of the Estate of Arden Frye, Deceased.*